No. 616,070. Patented Dec. 20, 1898.
J. P. BARRON, J. R. LOGAN & M. S. SHERIDAN.
MACHINE FOR MEASURING WIRE AND INDICATING ITS WEIGHT.
(Application filed Oct. 25, 1897.)

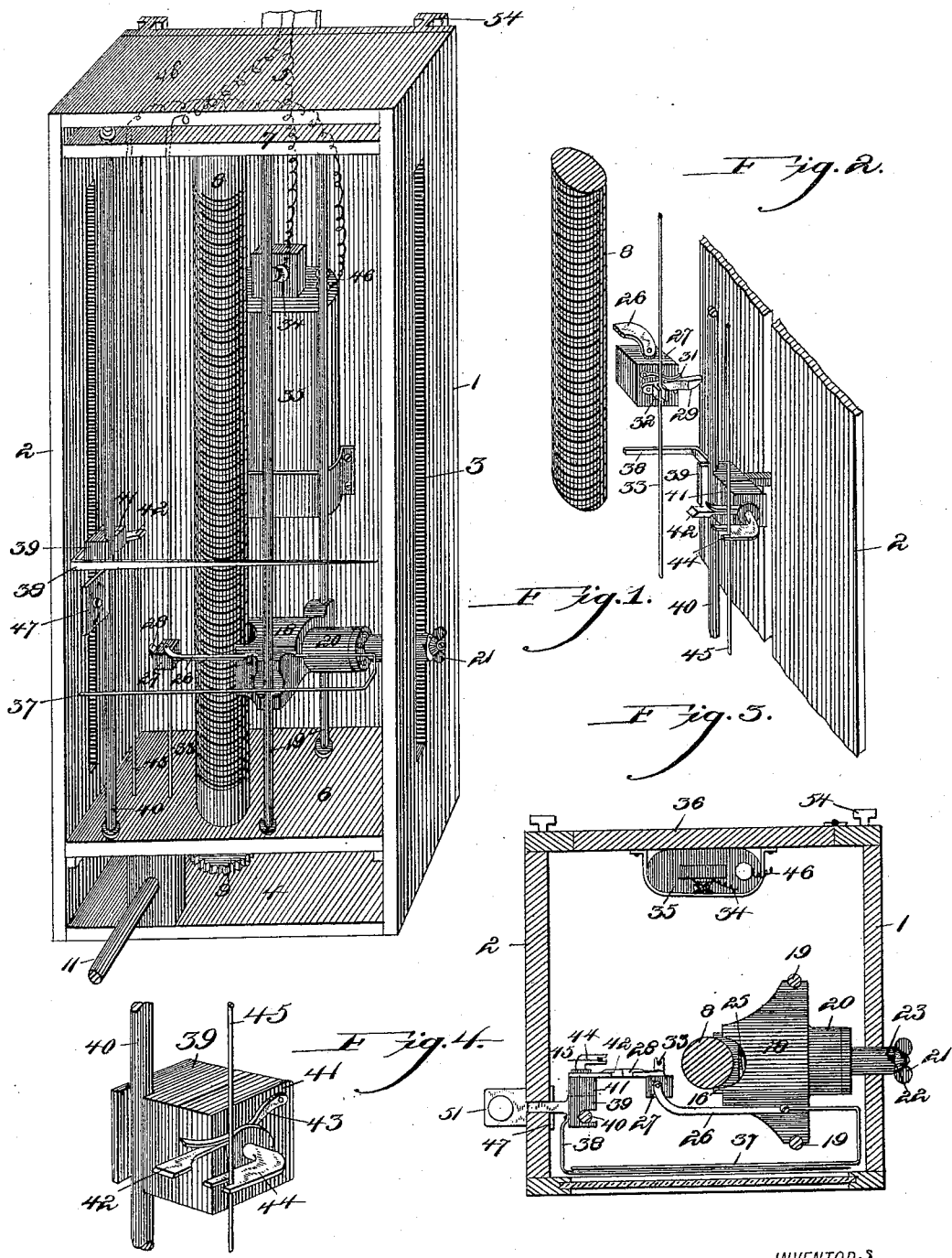

(No Model.) 3 Sheets—Sheet 2.

WITNESSES:
J. P. Appleman
A. R. Wilson

INVENTORS
James P. Barron
John R. Logan
Martin S. Sheridan
BY
Henry C. Evert
ATTORNEY.

THE NORRIS PETERS CO., PHOTO-LITHO., WASHINGTON, D. C.

No. 616,070. Patented Dec. 20, 1898.
J. P. BARRON, J. R. LOGAN & M. S. SHERIDAN.
MACHINE FOR MEASURING WIRE AND INDICATING ITS WEIGHT.
(Application filed Oct. 25, 1897.)
(No Model.) 3 Sheets—Sheet 3.

WITNESSES:
J. P. Appleman.
J. R. Wilson.

INVENTORS
James P. Barron.
John R. Logan.
Martin S. Sheridan.
BY
Henry C. Evert
ATTORNEY.

UNITED STATES PATENT OFFICE.

JAMES P. BARRON, JOHN R. LOGAN, AND MARTIN S. SHERIDAN, OF PITTSBURG, PENNSYLVANIA.

MACHINE FOR MEASURING WIRE AND INDICATING ITS WEIGHT.

SPECIFICATION forming part of Letters Patent No. 616,070, dated December 20, 1898.

Application filed October 25, 1897. Serial No. 656,271. (No model.)

*To all whom it may concern:*

Be it known that we, JAMES P. BARRON, JOHN R. LOGAN, and MARTIN S. SHERIDAN, citizens of the United States of America, residing at Pittsburg, in the county of Allegheny and State of Pennsylvania, have invented certain new and useful Improvements in Machines for Measuring Wire and Indicating its Weight, of which the following is a specification, reference being had therein to the accompanying drawings.

This invention relates to certain new and useful improvements in a machine for measuring wire and indicating its weight.

The invention has for its object to construct a machine whereby the wire is measured and the weight indicated as it is wound upon and formed into commercial rolls, thereby obviating the necessity of weighing these rolls to obtain a certain desired quantity of wire.

The principal features of our invention consist in the screw-threaded shaft, which is operated by a gearing connected with same, and a shaft upon which is mounted the commercial roll, and as the aforesaid screw-threaded shaft is operated by the winding of the wire upon the commercial reel it tends to operate a vertically-moving yoke-block which carries a contact-pin into engagement with another contact-pin at a point where the indicator has been set and completing an electrical circuit, which causes the tappet-bell to ring and indicate that the required amount of wire has been wound upon the commercial reel.

The invention consists, further, in the novel construction, combination, and arrangement of parts, to be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 5:
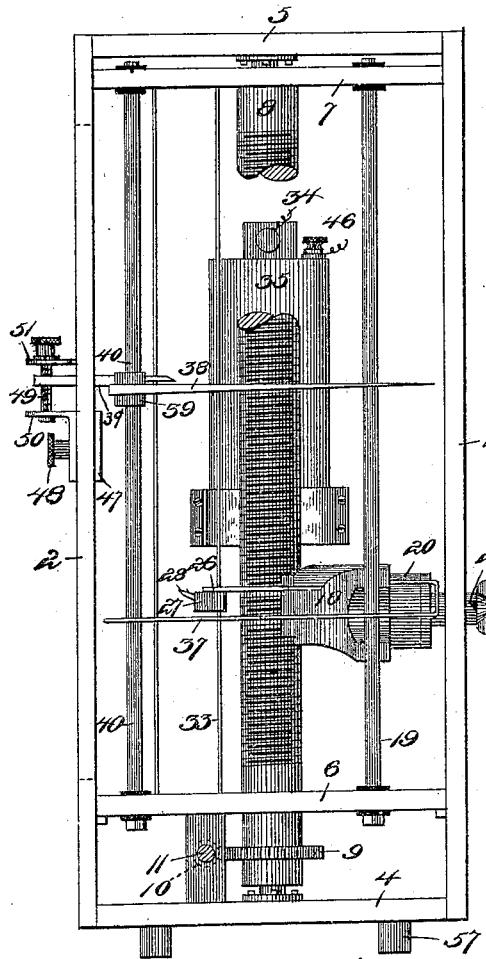
Figure 6:
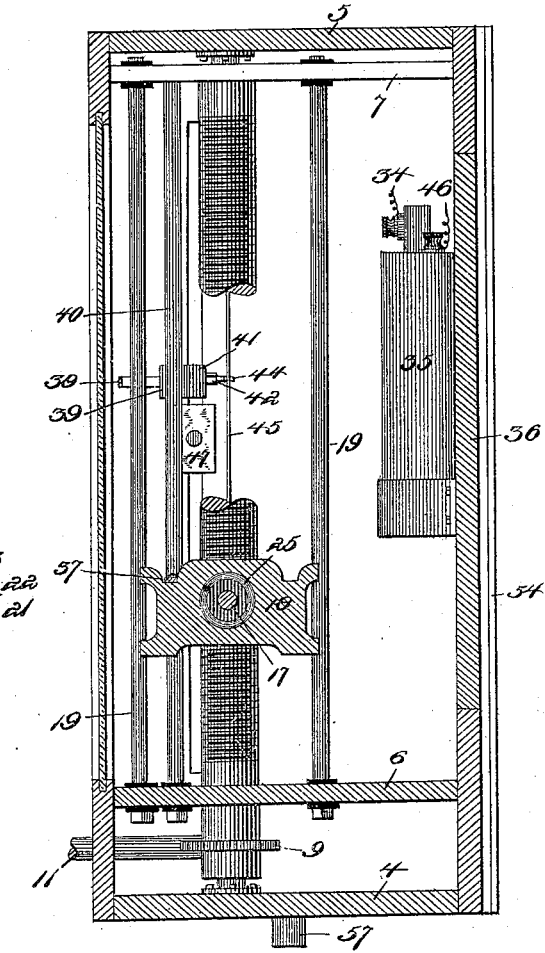
Figure 7:
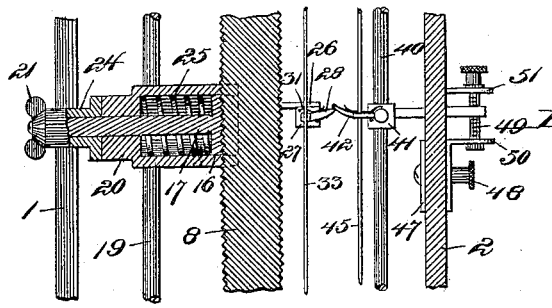
Figure 8:
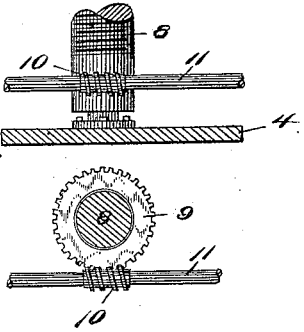

Figure 1 is a perspective view of our improved machine with a scale-sheet which is secured on the front of the box removed. Fig. 2 is a detail perspective view of the device by which the electrical circuit is completed, also showing a portion of the screw-threaded shaft and of the casing. Fig. 3 is a horizontal sectional view. Fig. 4 is a detail perspective view of the block which carries the indicating-hand, showing contacts attached thereto which complete the electrical circuit. Fig. 5 is a front elevation with the scale-sheet removed. Fig. 6 is a vertical sectional view with the screw-threaded shaft partly broken away. Fig. 7 is a detail sectional view of the clutching mechanism which engages the screw-threaded shaft and also showing a detail of the contact-pin. Fig. 8 shows two detail sectional views of the gearing for the screw-threaded shaft. Fig. 9 is a perspective view of the device as it appears when in position and showing the wire being wound upon the commercial reel. Fig. 10 is a detail view of the scale-sheet. Fig. 11 is a perspective view of the screw-threaded clutch that engages the shaft. Fig. 12 is a perspective view of the insulation-block carried by the yoke-block, showing one of the contact-pins which completes the electrical circuit.

The mechanism is inclosed within a suitable casing or box, the sides 1 2 of which are provided with slots 3, extending nearly their entire length, the purpose of which will be hereinafter more particularly described. This box or casing is provided with a suitable bottom 4 and a top 5 and also with a false bottom 6 and a false top 7. Arranged vertically within the casing or box is a screw-threaded shaft 8, which is journaled in the false top 7 and in the bottom 4 and has secured thereon, between the said bottom 4 and the false bottom 6, a spur-gear 9, which meshes with the worm-screw 10, carried by a rod or shaft 11, upon which is mounted a guide-reel 12, the said guide-reel also serving the purpose of an actuating-pulley to communicate motion to the vertical shaft within the casing by means of the shaft 11 and the gearing 9 10.

In Fig. 9 the wire 13 is represented as passing from the galvanizing-vat over a suitably-disposed guide-pulley 14, the guide or actuating pulley 12, and onto the commercial reel 15, which is placed at a point several degrees below the position of the actuating-pulley 12, so that the tension of the wire upon the said pulley will serve to actuate the vertical shaft and indicate the weight of the wire as the same passes onto the commercial reel. As this vertical shaft 8 revolves it moves the screw-threaded clutch 16, which engages the same so as to bring the contact-pins into engagement with each other and complete the electrical circuit when the quantity of wire has been wound upon the reel, at which point the indicating-hand has previously been set. This clutch 16 is provided with a stem 17 and is supported by means of a yoke-block 18, which operates upon guide-rods 19, secured in the false bottom 6 and top 7. The yoke-block 18 is recessed, so as to permit the screw-threaded clutch 16 entering within the same when it is withdrawn from its engagement with the screw-threaded vertical shaft, and is also provided with a casing 20, through which the stem 17 extends, said stem also passing outwardly through the slot 3 in the casing side 1 and having loosely mounted on its outer end a winged nut 21, which is provided with an inclined projection 22, engaging in a similarly-inclined groove 23 on the end of the nut 24, Figs. 3 and 7, which is mounted upon the stem 17 and abuts against the free end of the casing 20. Thus as the winged nut 21 is turned the inclined projection 22 rides upon the incline of the nut 24, compressing spring 25 and withdrawing the clutch from its engagement with the vertical shaft 8, permitting the yoke-block to be readily adjusted vertically to any position desired. This yoke-block 18 has also secured thereto an arm 26, extending upwardly past the vertical rod 8 and carrying a block 27, which may be composed of any suitable insulating material, said block having pivotally attached thereto the contact-pin 28, provided with an inclined face 29 and which is held normally on its stop-pin 30, so as to retain the same in the horizontal position by means of the spring 31. The head of the pivotal pin of this contact is formed in the clutch 32, which engages the contact-wire 33, extending vertically within the casing from the false bottom 6 to the false top 7, and is connected to the positive wire 34 of the battery 35, which is preferably secured to the inner face of the door 36 forming the back of the casing, so that the mechanism may be readily reached. The yoke-block 18 also carries an indicating-hand 37, which extends across the front of the sheet-scale, so that the operator may readily discern when the quantity of wire upon the commercial reel is nearing the amount at which the weight-hand has been set. This weight-hand 38 is secured to a block 39, having a stem 39ª, which extends through the oblong slot 3 in the casing side 2, said block 39 operating upon a guide-rod 40, secured in the false bottom 6 and top 7. To this block 39 is secured a block 41, composed of any desired insulating material, which carries the pivotal contact-pin 42, held normally in the horizontal position by means of a spring 43, the said block also carrying a clutch 44, which engages the contact-wire 45, with which connection is made to the negative-wire 46 of the battery. The weight-hand is set by means of the bracket 47, having a fastening-screw 48, Fig. 5, operating through the slot in the casing side 2, and after being placed near the desired point the hand may be precisely regulated by means of the set-screw 49, which is supported in bearings 50 51, carried by the bracket 47, the said screw 49 passing through the stem 39ª. Thus as the set-screw 48 is loosened the block 39 and hand 38 are moved vertically to or near the desired point, and the set-screw 48 is then fastened to hold the same in this position. The set-screw 49 may then be used to bring the hand 38 to the precise point desired upon the scale-sheet. The scale-sheet 52 forms the front of the casing and may be secured thereto in any desired manner. At the base of this scale-sheet the numerals "4" to "16" are shown, which represent the different gage of wire, and to each one of these figures a vertical line is arranged upon the scale-sheet with a number of pounds marked at the desired point on said lines. Thus, for instance, we will assume that the hand 38 is set at one hundred and fifty pounds of No. 11 wire. As the wire passes over the actuating-pulley 12 it communicates motion through the gearing to the shaft which operates the clutch 16, engaging the same, which, together with the yoke-block 18, moves upwardly until the contact-pin 28 is brought into engagement with the contact-pin 42, where the electrical circuit is completed, causing the tappet-bell 53 to ring and indicate to the operator that the desired quantity has been wound upon the commercial reel. The operator can readily tell when the quantity has been nearly reached by reason of the hand 37 approaching into close proximity with the hand 38, and when the two hands are upon a parallel line with each other the contact-pins will have been brought into engagement to complete the electrical circuit.

The device is preferably secured in its position by means of guides 54, formed on the back of the casing, which are inserted in guideways provided therefor, thus allowing its ready removal and also permitting the vertical adjustment of the indicating-hands, so that the tension of the wire will not be too great upon the actuating-pulley 12.

Underneath the casing and rigidly secured to the object supporting the device is a bracket 54, having pins 55 on its upper face, which are engaged by the lower ends of stiff coil tension-springs 56, the upper ends of which engage upon similar pins 57, secured to the base of the casing, these springs serving to normally support the device, so as to obtain sufficient tension of the wire upon the actuating-pulley. By this arrangement and construction it will be observed that the desired quantity in pounds of any gage of wire may readily be wound on the commercial reel, and when the desired amount has been reached the alarm-bell instantly signals the operator that he may stop the wire passing to the reel.

Ordinarily the wire is wound on the commercial reel without obtaining the weight of the same, and upon the receipt of an order for a stated amount in pounds it becomes necessary to unwind the wire from the commercial reel and weigh the same. By our invention this is obviated, as the reels may be each filled with a predetermined quantity and each reel marked so that weighing will be unnecessary.

It will be noted that various changes may be made in the details of construction without departing from the general spirit of our invention.

Having fully described our invention, what we claim as new, and desire to secure by Letters Patent, is—

1. In a machine of the character described, the combination of a casing having a false top and bottom, a screw-threaded shaft journaled in the false top and the bottom 4 of said casing, a yoke arranged in said casing, said yoke being recessed and adapted to receive a clutch, said clutch engaging said shaft and adapted to be operated thereby, an indicating-arm secured to said yoke, an actuating-pulley, connection between said actuating-pulley and said shaft whereby the shaft is operated by wire passing over said actuating-pulley, substantially as herein shown and described.

2. In a machine of the character described, the combination of a casing having elongated slots in the sides thereof, a shaft journaled in said casing, an actuating-pulley, connection between said actuating-pulley and said shaft whereby said shaft is operated, a clutch arranged in said casing and adapted to be operated by said shaft, a recessed yoke adapted to receive said clutch, guide-rods for said yoke, an indicating-arm secured to said yoke, a tappet-bell, and means whereby an electric circuit is completed to sound the bell at a predetermined time, substantially as herein shown and described.

3. In a machine of the character described, the combination of a casing having elongated slots in the sides thereof, a false top and bottom in said casing, a vertical screw-threaded shaft journaled in said false top and bottom 4 of said casing, an adjustable yoke-block carrying a clutch arranged in said casing, said clutch adapted to engage and to be operated by said shaft, an actuating-pulley, connection between said actuating-pulley and said shaft, adjustable contact-pins arranged in said casing, said contact-pins connected to an electric battery adapted to complete an electric circuit through the operation of said shaft, substantially as herein shown and described.

4. In a machine for measuring wire and indicating its weight, the combination with a casing having elongated slots in the sides thereof, said casing carrying guides for securing the same in position, a false top and bottom secured in said casing, a shaft arranged in said casing, an actuating-pulley, said shaft operated by said actuating-pulley, an adjustable yoke carrying a clutch, said clutch adapted to be operated by said shaft, indicating-hands arranged in said casing, adjustable contact-pins forming an electric circuit at a predetermined time, substantially as herein shown and described.

5. In a machine for measuring wire and indicating its weight, the combination of a casing having elongated slots in the sides thereof, a false top and bottom arranged in said casing, a bell secured to the top of said casing, a screw-threaded shaft journaled in said casing, an actuating-pulley, connection between said actuating-pulley and said shaft, an adjustable yoke arranged in said casing and carrying a clutch, said clutch adapted to be operated by said shaft, indicating-hands mounted in said casing, contact-pins adjustably arranged in said casing whereby upon their contact the bell is sounded to indicate the amount of wire upon the reel, substantially as herein shown and described.

6. In a machine of the character described, a casing, said casing having a false top and bottom, a shaft journaled in said casing, an actuating-pulley, connection between said actuating-pulley and said shaft, an adjustable yoke, a clutch carried by said adjustable yoke and adapted to be operated by said shaft, guide-rods in said casing for the adjustable yoke, indicating-hands, clutches carrying contact-pins, said clutches adapted to engage contact-wires, an alarm-bell, means whereby the contact-pins are brought into engagement with each other thereby forming a complete electric circuit by which the alarm-bell is sounded and the amount of wire upon the reel is indicated, substantially as herein shown and described.

In testimony whereof we affix our signatures in presence of two witnesses.

JAMES P. BARRON.
JOHN R. LOGAN.
MARTIN S. SHERIDAN.

Witnesses:
JOHN NOLAND,
THOS. M. BOYD, Jr.